(12) United States Patent
Rosenberger et al.

(10) Patent No.: US 11,985,379 B2
(45) Date of Patent: May 14, 2024

(54) SYSTEM AND METHOD FOR SEAMLESS CONTENT TRANSITION

(71) Applicant: ARRIS ENTERPRISES LLC, Suwanee, GA (US)

(72) Inventors: Aniela M. Rosenberger, Norristown, PA (US); William P. Franks, San Diego, CA (US); Kaliraj Kalaichelvan, San Diego, CA (US); Arpan Kumar Kaushal, San Diego, CA (US); Rajesh K. Rao, San Marcos, CA (US); Ernest G. Schmitt, Maple Glen, PA (US)

(73) Assignee: ARRIS Enterprises LLC, Horsham, PA (US)

( * ) Notice: Subject to any disclaimer, the term of this patent is extended or adjusted under 35 U.S.C. 154(b) by 16 days.

(21) Appl. No.: 17/671,835

(22) Filed: Feb. 15, 2022

(65) Prior Publication Data
US 2022/0321942 A1    Oct. 6, 2022

Related U.S. Application Data

(60) Provisional application No. 63/170,687, filed on Apr. 5, 2021.

(51) Int. Cl.
| | | |
|---|---|---|
| H04N 21/218 | (2011.01) | |
| H04L 65/611 | (2022.01) | |
| H04N 21/2187 | (2011.01) | |
| H04N 21/234 | (2011.01) | |
| H04N 21/236 | (2011.01) | |
| H04N 21/41 | (2011.01) | |
| H04N 21/433 | (2011.01) | |
| H04N 21/438 | (2011.01) | |
| H04N 21/472 | (2011.01) | |
| H04N 21/6587 | (2011.01) | |

(Continued)

(52) U.S. Cl.
CPC ......... *H04N 21/438* (2013.01); *H04L 65/611* (2022.05); *H04N 21/2187* (2013.01); *H04N 21/4334* (2013.01); *H04N 21/47217* (2013.01); *H04N 21/8455* (2013.01); *H04N 21/8586* (2013.01)

(58) Field of Classification Search
None
See application file for complete search history.

(56) References Cited

U.S. PATENT DOCUMENTS

| 8,875,175 B1 * | 10/2014 | McCoy | H04N 21/6543 |
| | | | 725/115 |
| 2011/0302524 A1 * | 12/2011 | Forstall | G06F 16/9577 |
| | | | 715/781 |

(Continued)

OTHER PUBLICATIONS

International Search Report and Written Opinion for Application No. PCT/US2022/016392 dated Jun. 2, 2022 (9 pages).

*Primary Examiner* — Brian T Pendleton
*Assistant Examiner* — Jean D Saint Cyr
(74) *Attorney, Agent, or Firm* — Panitch Schwarze Belisario & Nadel LLP

(57) ABSTRACT

A system and method enabling the seamless transition between viewing a recorded portion of a program and rejoining a live stream of that program. The system and method enable the rapid provision of live-streamed content upon the exhaustion of the playback of recorded content. This achieved by utilizing a universal resource locator associated with the source of the content.

16 Claims, 3 Drawing Sheets

(51) Int. Cl.
*H04N 21/845* (2011.01)
*H04N 21/858* (2011.01)

(56) References Cited

U.S. PATENT DOCUMENTS

| | | | | |
|---|---|---|---|---|
| 2014/0177964 | A1* | 6/2014 | Godlewski | H04N 21/2343 |
| | | | | 382/190 |
| 2014/0317307 | A1* | 10/2014 | Giladi | H04L 65/65 |
| | | | | 709/231 |
| 2016/0373462 | A1* | 12/2016 | Wang | G06F 21/64 |
| 2017/0195736 | A1* | 7/2017 | Chai | H04N 21/4821 |
| 2018/0013805 | A1* | 1/2018 | Mandyam | H04L 65/765 |
| 2019/0349379 | A1 | 11/2019 | Thomas | |

* cited by examiner

SYSTEM AND METHOD FOR SEAMLESS CONTENT TRANSITION

CROSS-REFERENCE TO RELATED APPLICATION

This application claims the benefit of U.S. Provisional Patent Application No. 63/170,687, filed Apr. 5, 2021, which is incorporated by reference herein in its entirety.

BACKGROUND OF THE INVENTION

With the increased availability of residential broadband delivery of digital video content and the ever-growing number and variety of digital video content sources, consumers are storing more content than ever on digital video recorders ("DVRs"). Many residences may even have multiple DVRs to meet the demands for content storage within a given household. These devices, often integrated into set-top boxes, offer consumers a convenient means of capturing one or more live streams of digital content for later and/or repeated viewing.

Unfortunately, the advent of an ever-increasing amount of certain playback conditions can cause a DVR to deliver an inconsistent or disjointed viewing experience to a user. One particular inconsistency typically occurs when a user that was viewing a recorded portion of a program that is still being broadcast or streamed. Assume that the program being viewed has a duration of one hour and began streaming to the DVR at time to. The user accesses the DVR at some time after to, but prior to the end of the streaming of the program, and begins consuming the recorded portion of the program. Then, by utilizing fast-forward or other trick-play functionality, the user advances to the terminus of the recorded content. At this juncture, the DVR would need to switch to the live streaming content to continue the user's viewing experience in a continuous manner.

However, achieving a seamless switch to the incoming stream of video is not something that can be accomplished with present DVR technology. There is a discontinuity manifested as a delay or break in the viewed content introduced by the need for the DVR system to reload the media presentation description ("MPD") file that defines and enables the connection to the incoming streamed content. This reloading/connection process invariably introduces a delay resulting in an inconsistent viewing experience. The DVR might also be adapted to simply wait for the next available segment of the incoming stream to be received and then access it. However, this too would involve a delay which would invariably cause an inconsistency in the viewed program.

Consequently, there exists a need for a system and method supporting an improved process that provides improved continuity when transitioning between the viewing of a recorded program portion and the viewing of the streaming remainder of that program.

BRIEF SUMMARY OF THE INVENTION

A system and method enabling the seamless transition between viewing a recorded portion of a program and rejoining a live stream of that program. The system and method enable the rapid provision of live-streamed content upon the exhaustion of the playback of recorded content. This achieved by utilizing a universal resource locator associated with the source of the content.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
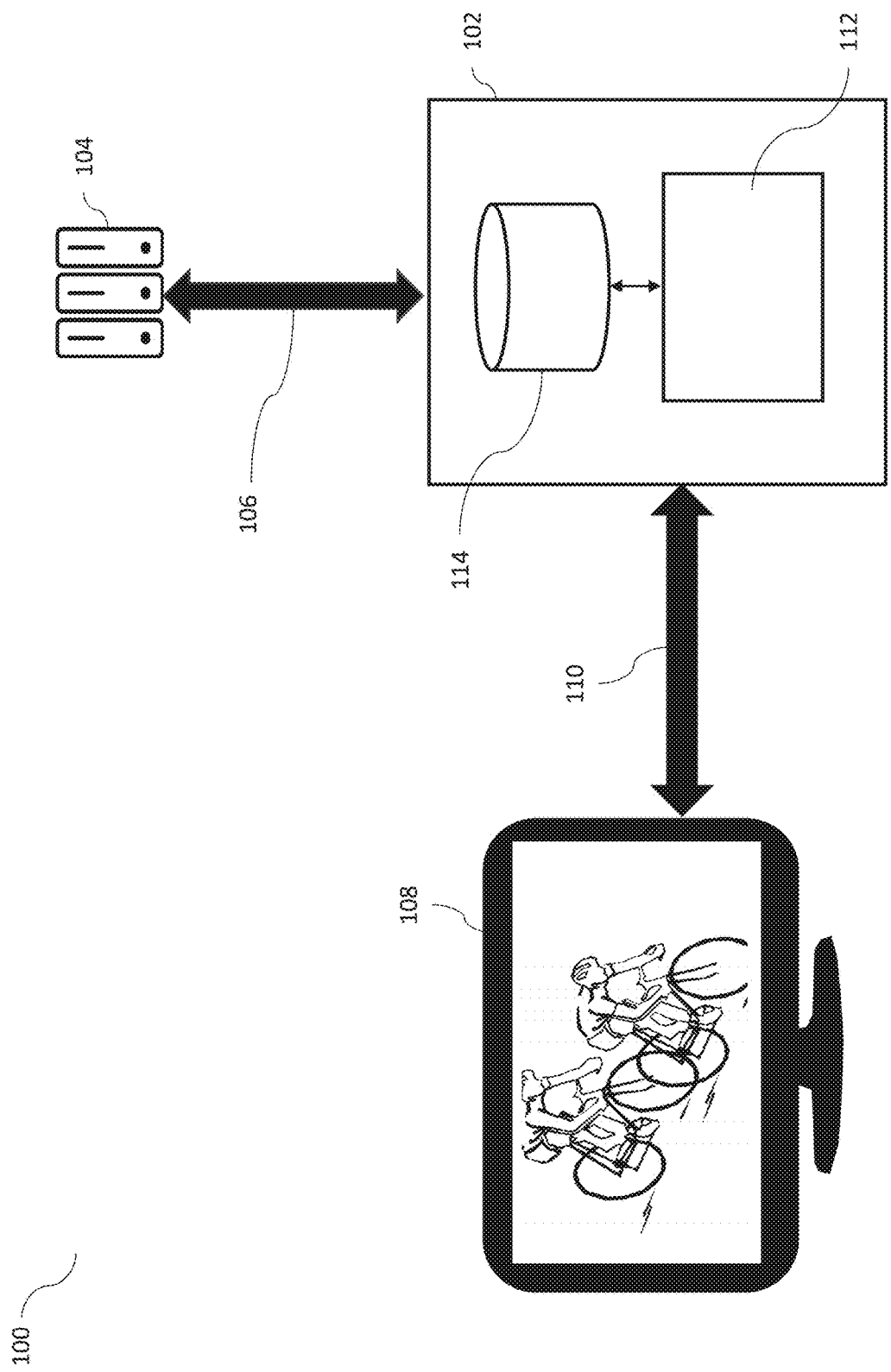
FIG. 1 is a functional block diagram of a system supporting the seamless transition between recorded DVR content and streaming content.

FIG. 1 provides a functional block diagram of system 100 which supports the seamless transition between viewing a recorded portion of a program and rejoining a live stream of that program. As shown, the system includes media gateway appliance ("MGA") 102 which is linked to content delivery network ("CDN") 104 via broadband network 106. CDN 104 could be any remote source of video content such as an Internet streaming service or a multi-service operator ("MSO") headend. Broadband network 106 can be a wired or wireless network capable of supporting broadband, bidirectional communications between MGA 102 and headend 104. MGA 102 is also shown to be linked to display 108 via interface 110. Interface 110 can be a wired connection such as a coaxial cable, high-definition media interface ("HDMI") link, or a wireless connection.

Figure 2:
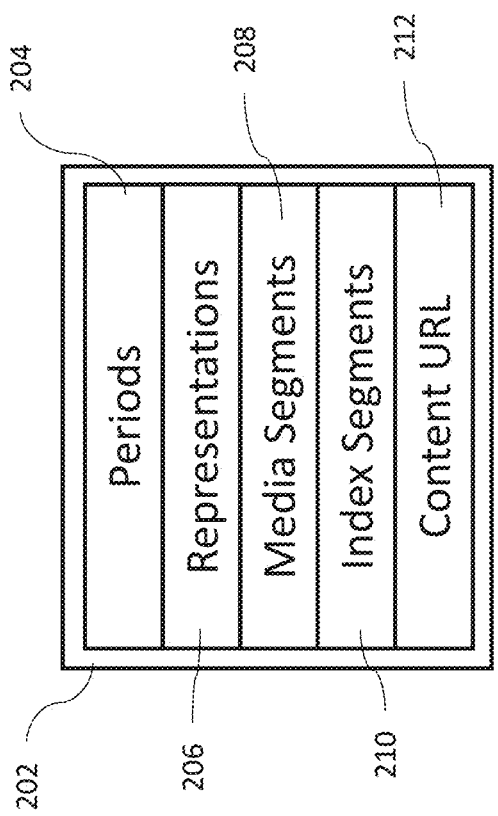
FIG. 2 is a graphical representation of components within a hybrid MPD compatible with the system of FIG. 1.

MGA 102 is shown to include controller 112 and memory 114 which are adapted to provide DVR functionality. As is typical for a DVR, incoming streaming video received via broadband network 106 is stored within memory 114, enabling a user to view the recorded content upon display 108 as desired. Controller 112 is adapted to create a hybrid MPD ("HMPD") that includes a universal resource locator ("URL") for the CDN providing the program being recorded. FIG. 2 provides a representation of components included within an HMPD (202) supporting a first process in the system of FIG. 1. The majority of the components depicted are those typically found in MPDs formatted in accordance with International Standard ISO/IEC 23009:1— Dynamic adaptive streaming over HTTP (DASH)—Part 1: Media presentation description and segment formats. The data contained in in the Periods (204), Representations (206), Media Segments (208) and Index Segments (210) is well-known in the art and will not be discussed in detail here. A departure from the information commonly included in an MPD is the inclusion of Content URL information (212) within HMPD 202. It is the inclusion of such, along with programming of controller 112 to utilize this URL information in accordance with the processes set forth below that enables the seamless transition from recorded DVR content to streaming content.

Figure 3:
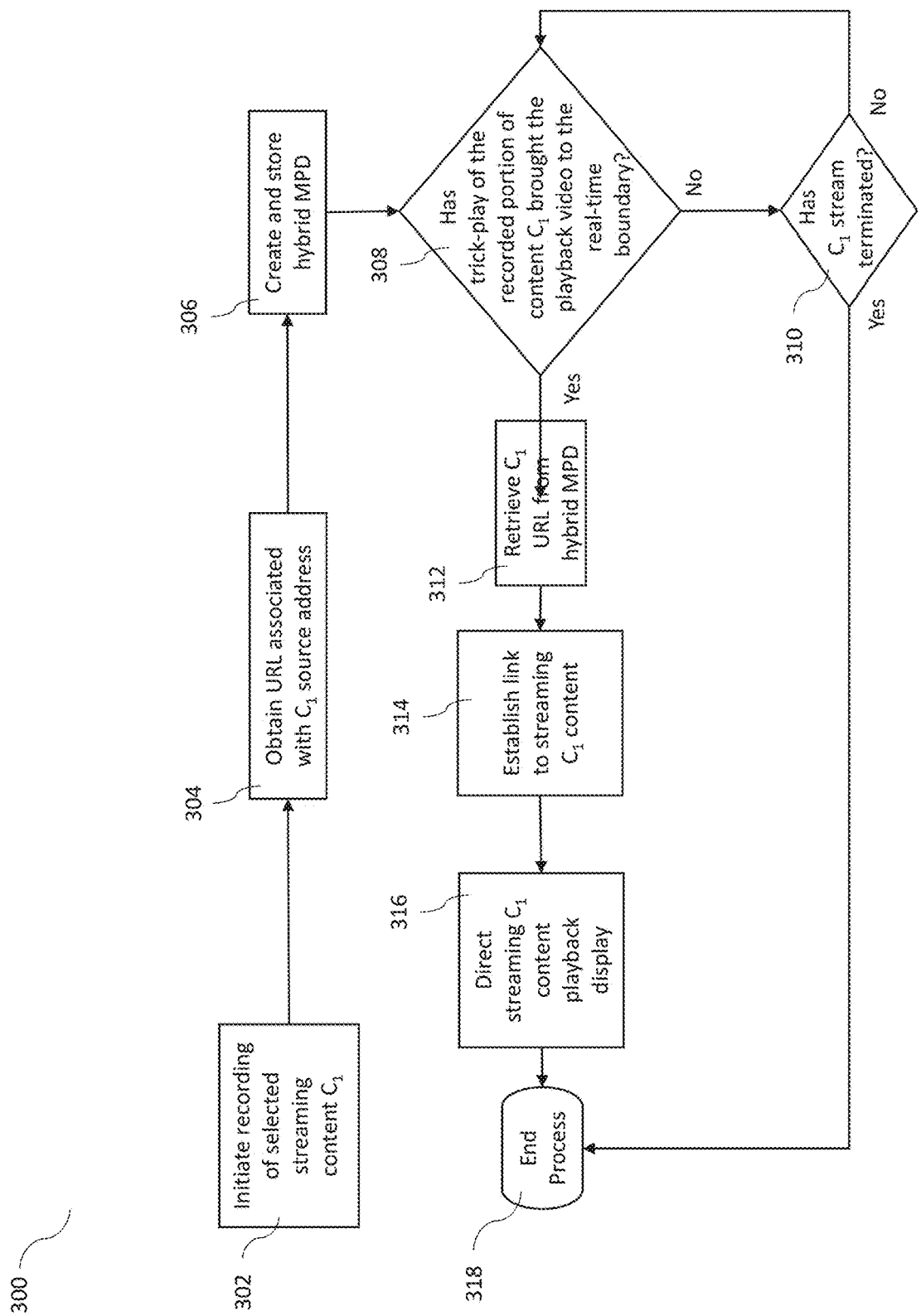
FIG. 3 is a flow diagram of a first process supported by the system of FIG. 1 enabling a seamless transition between recorded DVR content and streaming content.

FIG. 3 provides a flow diagram of a preferred process (300) utilizing the HMPD of FIG. 2 and system 100 of FIG. 1. The process begins with the initiation of the recoding of a particular streaming content, $C_1$ (step 302). User input would typically be the event that initiated the process. This input could be in real-time, or the result of a previous action by a user that was stored for later execution. Such user input is typically accomplished via a user interface such as a hand-held remote control associated with an MGA or a display device such as a digital television. However, user input could also be provided via any number of smart or networked devices such as tablets, computing systems, virtual assistants, and/or smartphones linked to the MGA or the display. This recorded content that is initiated would be stored within memory 114 (FIG. 1). Next, in step 304, the URL of content $C_1$ is obtained. This URL, along with the other typical components of an MPD are included in an HMPD which is stored in memory (step 306). The system then tests if a user has utilized a trick-play function during the viewing of the recorded Ci content which has brought the played back video to the real-time boundary (step 308). In other words, the playback of the recorded $C_1$ content has been exhausted and continuing to play the $C_1$ content would require the next frame of video to come from the content being streamed, in real-time, via broadband network 106 (FIG. 1).

If the conditional at step 308 yields a negative result, the test simply loops back and the query is repeated until a positive result is obtained, or the streaming of content $C_1$ has terminated (steps 310 and 318). If, however, conditional 308 yields an affirmative result, the system retrieves the URL associated with the streaming of content C1 (step 312) and establishes a connection thereto (step 316) via broadband network 106 (FIG. 1). In step 316 the incoming content stream this then directed to the playback display (display device 108 of FIG. 1). The process then terminates at step 318.

The ability of the disclosed process to readily access the live stream associated with the recorded content enables the system to switch to that live feed very quickly. There is no delay introduced by the need to reload content or await the storage of the next segment of incoming content. The result is a smoother transition from recorded content to streaming content, providing a user with a viewing experience that appears seamless.

Although the invention herein has been described with reference to particular embodiments, it is to be understood that these embodiments are merely illustrative of the principles and applications of the present invention. Other embodiments and variations could be implemented without departing from the spirit and scope of the present invention as defined by the appended claims. For example, the depiction of the HMPD is not meant to be exhaustive. Other data fields, not critical to the delivery of a seamless video transition, could be included in accordance with various standards and particular system and network requirements. In addition, it will be understood that the various connections depicted as wired in the above embodiments could also be supported by wireless connections without departing from the scope of the invention. The controller can be a single or multiple multi-processor system, co-located with the memory or remotely based in whole or in part. The memory supporting the storage of the video content can be a disk, a solid-state drive, cloud-based storage (in whole or in part), or any other means with sufficient capacity and speed to facilitate video storage and playback. Similarly, any number of various video-capable devices could serve as the display. These include digital televisions, tablets, smart phones, computer monitors, etc.

The invention claimed is:

1. A system for the transition from playback of recorded video content to streaming video content, comprising:
a display device;
a memory device storing streaming video content; and
a controller configured to:
obtain a content uniform resource locator (URL) for a content delivery network (CDN) providing the streaming video content;
create a hybrid media presentation description (HMPD) that includes at least (i) media segments, (ii) index segments, and (iii) the content URL for the CDN providing the streaming video content;
store said HMPD in the memory device in association with the stored streaming video content;
detect that (i) a playback of the stored streaming video content upon the display device has been exhausted, and (ii) the streaming of the video content associated with the stored content URL is still in progress;
in response to detecting that (i) the playback of the stored streaming video content upon the display device has been exhausted, and (ii) the streaming of the video content associated with the stored content URL is still in progress, retrieve the content URL from the HMPD and establish a connection to the streaming video content utilizing the retrieved content URL; and
upon establishing said connection, direct the in progress streaming video content to the display device.

2. The system of claim 1 wherein the memory device and the controller comprise a digital video recording device.

3. The system of claim 1 wherein the content delivery network is a remote source of video content including one of a streaming service and a multi-service provider.

4. The system of claim 1 wherein the memory comprises at least one of the following:
a disc drive;
a solid-state drive; and
a cloud-based storage system.

5. The system of claim 1 wherein the display device comprises one of the following:
a digital television;
a computer monitor;
a tablet; and
a smartphone.

6. The system of claim 1 further comprising a user interface configured to receive input from a user indicative of commands to perform at least one of the following functions:
record a particular streaming content;
playback a particular streaming content from the memory device; and
perform a trick-play function upon the video being played back.

7. The system of claim 6 wherein the user interface comprises one of the following:
a hand-held remote-control device;
a computer system;
a tablet;
a virtual assistant; and
a smartphone.

8. The system of claim 6 wherein the trick-play function comprises a fast-forward operation.

9. A method transitioning from the playback of recorded video content to streaming video content, in a system comprising a display device, a memory device storing streaming video content, and a controller, wherein the method comprises:
obtaining, by the controller, a content uniform resource locator (URL) for a content delivery network (CDN) providing the streaming video content;
creating, by the controller, a hybrid media presentation description (HMPD) that includes at least (i) media segments, (ii) index segments, and (iii) the content URL for the CDN providing the streaming video content;

storing, by the controller, said HMPD in the memory device in association with the stored streaming video content;

detecting, by the controller, (i) a playback of the stored streaming video content has been exhausted, and (ii) the streaming of the video content associated with the stored content URL is still in progress;

in response to detecting (i) the playback of the stored streaming video content has been exhausted, and (ii) the streaming of the video content associated with the stored content URL is still in progress, retrieving the content URL from the HMPD and establishing a connection to the streaming video content utilizing the retrieved content URL; and upon establishing said connection, directing, by the controller, the in progress streaming video content to the display device.

10. The method of claim 9 wherein the memory device and the controller comprise a digital video recording device.

11. The method of claim 9 wherein the content delivery network is a remote source of video content including one of a streaming service and a multi-service provider.

12. The method of claim 9 wherein the memory comprises at least one of the following:
a disc drive;
a solid-state drive; and
a cloud-based storage system.

13. The method of claim 9 wherein the display device comprises one of the following:
a digital television;
a computer monitor;
a tablet; and
a smartphone.

14. The method of claim 9 further comprising a user interface configured to receive input from a user indicative of commands to perform at least one of the following functions:
record a particular streaming content;
playback a particular streaming content from the memory device; and
perform a trick-play function upon the video being played back.

15. The method of claim 14 wherein the user interface comprises one of the following:
a hand-held remote-control device;
a computer system;
a tablet;
a virtual assistant; and
a smartphone.

16. The method of claim 14 wherein the trick-play function comprises a fast-forward operation.

* * * * *